May 6, 1941.  A. O. SARFF  2,241,320
WEEDLESS FISHHOOK
Filed April 3, 1939
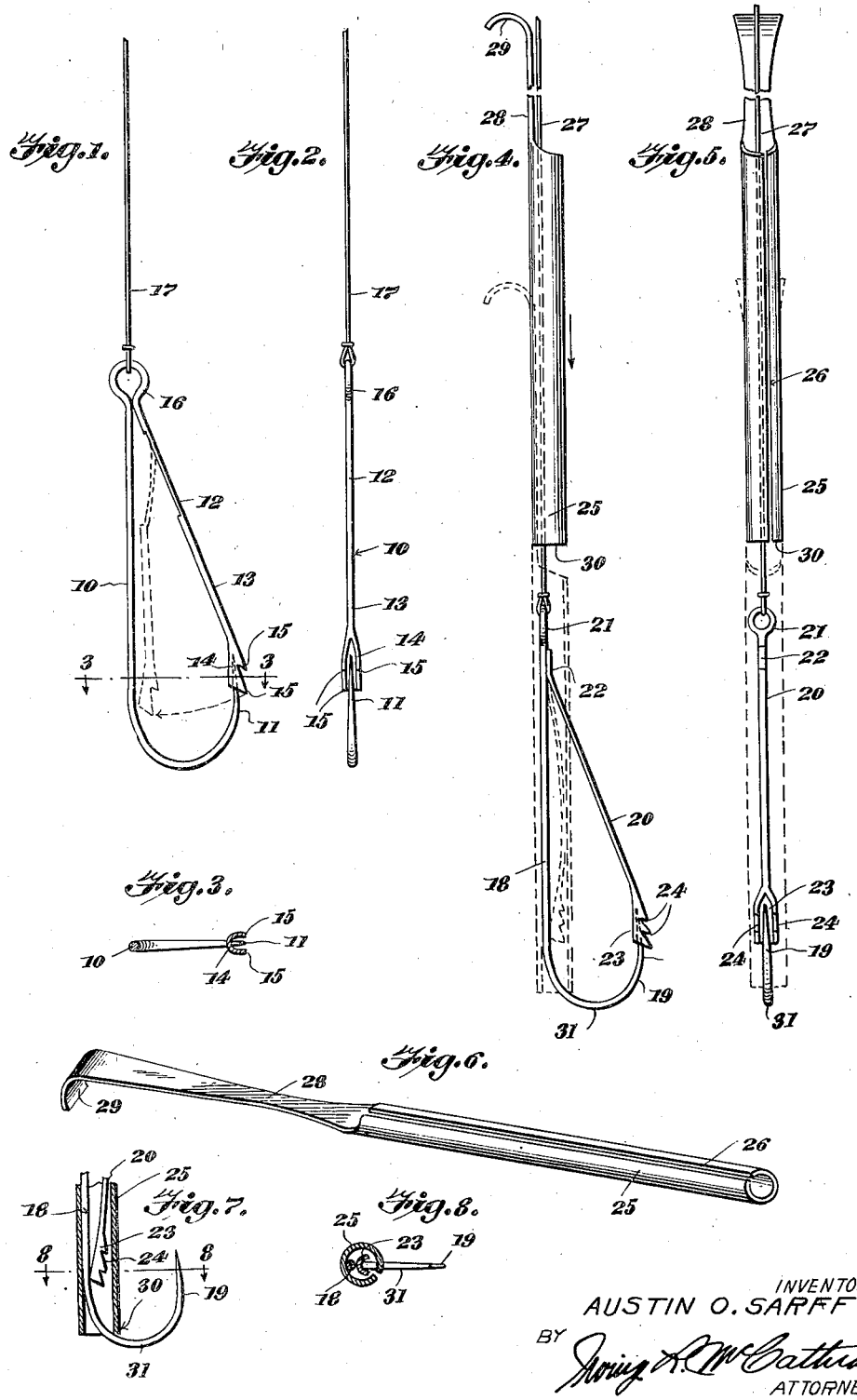
INVENTOR
AUSTIN O. SARFF
ATTORNEY Patented May 6, 1941

2,241,320

UNITED STATES PATENT OFFICE 2,241,320

WEEDLESS FISHHOOK

Austin O. Sarff, Walker, Minn.

Application April 3, 1939, Serial No. 265,837

5 Claims. (Cl. 43—38)

This invention relates to a weedless fishhook, and releasable means therefor, and has for one of its objects the production of a simple and efficient flexible locking means for retaining a snared object upon the hook.

A further object of this invention is the production of a simple and efficient means for releasing the flexible locking means carried by the hook.

Other objects and advantages of the present invention will appear throughout the following specification and claims.

In the drawing:

Figure 1 is a side elevational view of the improved hook and flexible locking means;

Figure 2 is a front elevational view;

Figure 3 is a transverse sectional view taken on line 3—3 of Figure 1;

Figure 4 is a side elevational view of a modified type of hook, showing releasing means therefor;

Figure 5 is a front elevational view of the type of structure shown in Figure 4;

Figure 6 is a perspective view of the releasing tube;

Figure 7 is a fragmentary sectional view of one end of the releasing tube, a portion of the hook and locking means being shown;

Figure 8 is a transverse sectional view taken on line 8—8 of Figure 7.

By referring to the drawing, it will be seen that 10 designates the hook, which is provided with a straight point 11, without the conventional barb. This hook 10 is preferably formed of one piece having a flattened portion 12 to add flexibility to the locking means or device 13 which constitutes an extension from the flattened portion 12. The outer end of the locking device 13 is provided with a cupped-portion 14, within which the point 11 is adapted to be shielded. This cupped-portion 14 is provided with a series of backwardly slanting pressure points or barbs 15 upon either side of the cupped-portion, the points slanting toward the eye 16 to which eye 16 the line or leader 17 is adapted to be secured. The cupped-portion 14 is adapted to completely cover the point 11 thereby making the hook weedless.

In Figures 4 and 5 there is shown a modified type of hook 18 having a straight point 19 without the conventional barb. A flexible locking device 20 constituting a weedless attachment is attached to the shank of the hook 18 near the eye 21, as at 22. This locking device 20 is made of suitable material which will properly flex when taken in the mouth of a fish and still maintain the proper tension to return to the normal seating at the point of the hook and normally prevent weeds or moss from gathering on the point of the hook. The outer end of the locking device 20 is provided with a cupped-portion 23 in which the point 19 is adapted to be seated. This cupped-portion 23 is provided with a series of backwardly slanting pressure points or barbs 24 upon each side thereof, the points slanting toward the eye 21, as shown in Figure 4.

It should be understood that should an object, fish and the like, be caught on the hook 18, the points or barbs 24 would constantly press against the object and prevent the same from moving forward off the point 19 of the hook 18. The structure shown in Figures 1 and 2 operate in a manner similar to that above described.

In connection with the hook illustrated there is preferably employed a releasing tube 25 which is provided with a longitudinally extending slot 26 of a size to permit the line or leader, such as the leader 27, to pass therethrough and facilitate the assembly of the device. This slot 26 may be placed to one side of the longitudinal center of the tube as shown, if desired. An extending shank 28 projects from one end of the tube 25 and carries a finger-engaging hook 29 at its outer end. The tube 25 may be moved to the position shown in dotted lines in Figures 4 and 5, and in full lines in Figure 7, so as to completely cover the pressure points 24 of the locking means 20 to withdraw the locking means 20 away from the point 19. Further, by forcing the outer end 30 of the tube 25 against the short curved portion 31 of the hook 18, the point 19 may be easily released from the fish.

By considering the drawing, it will be seen that the tube 25 may be easily placed over the line or leader by slipping the line or leader through the longitudinal slot 26 and the tube 25 is then moved to the position shown in Figures 4 and 5. The tube 25 may then be moved so as to slide over the eye 21 in the direction of the locking device 20 compressing the locking device to the position shown in dotted lines in Figure 4 down toward the shank of the hook. The finger-engaging hook 29 will facilitate the movement of this tube 25. It should be understood that the tube 25 may be used in conjunction with the type of hook shown in Figures 1 and 2 without departing from the spirit of the invention.

What I claim is:

1. A fishhook of the class described comprising a shank, a spring locking device carried by the hook, the hook having a point, said locking device having a cupped-portion in which said point is adapted to fit, said cup-like portion having backwardly inclined points projecting outwardly and toward the forward end of the hook to provide pressure points to engage an object caught by the point of the hook, said locking device being adapted to flex inwardly toward the shank of the hook and away from the point of the hook when the point of the hook engages an object, and said pressure points being formed upon opposite sides of the cupped-portion.

2. A fishhook of the class described comprising a shank, a spring locking device carried by the hook, the hook having a point, said locking device having a cupped-portion in which said point is adapted to fit, and said cup-like portion having backwardly inclined points projecting outwardly and toward the forward end of the hook to provide pressure points to engage an object caught by the point of the hook, said spring locking device comprising an integral portion of the hook and having a reduced spring shank intermediate the ends of the locking device.

3. In combination with a hook having a spring locking device, the spring locking device being adapted to releasably engage the point of the hook to provide a weed shield, a releasing device comprising a longitudinally movable member slidable over the hook and locking device for compressing the locking device and moving the same away from the point of said hook, and said releasing device comprising a longitudinally extending tubular portion, said tubular portion having a longitudinal slot formed therein to facilitate the placing of said tubular portion over a fishing line.

4. In combination with a hook having a spring locking device, the spring locking device being adapted to releasably engage the point of the hook to provide a weed shield, a releasing device comprising a longitudinally movable member slidable over the hook and locking device for compressing the locking device and moving the same away from the point of said hook, said releasing device comprising a longitudinally extending tubular portion, said tubular portion having a longitudinal slot formed therein to facilitate the placing of said tubular portion over a fishing line, and an operating shank carried by the tubular portion, and said shank having a finger-engaging hook to facilitate the operation of said tubular portion.

5. In combination with a barbless hook having a shank and a hook point, a spring locking device secured at one end to the shank and releasably engaging the under face of the point, said locking device having a cup-like portion for receiving the point of the hook, and said cup-like portion having backwardly inclined barbs extending in a direction opposite to the extremity of the point of the hook and formed upon the edge of the cup-like portion for gripping the object engaged by the hook and preventing the accidental release of the object engaged by the hook while in the process of landing, the barbs being manually movable away from the point of the hook to facilitate the removal of the object from the front of the hook without interference by the barbs.

AUSTIN O. SARFF.